United States Patent
Iwasaki et al.

[15] 3,674,764
[45] July 4, 1972

[54] PROCESS FOR THE POLYMERIZATION OF OLEFINS

[72] Inventors: Koichiro Iwasaki; Kazuo Yamaguchi; Harutaka Kimura; Masayoshi Hasuo, all of Tokyo; Toru Tanaka, Kawaski, all of Japan

[73] Assignee: Mitsubishi Chemical Industries Limited

[22] Filed: June 4, 1971

[21] Appl. No.: 150,243

Related U.S. Application Data

[63] Continuation of Ser. No. 824,264, May 13, 1969, abandoned.

[30] Foreign Application Priority Data

May 16, 1968 Japan..................................43/32761

[52] U.S. Cl......................260/88.2 R, 252/429 A, 252/453, 260/93.7, 260/94.9 D, 260/94.9 DA, 260/94.9 E
[51] Int. Cl......................C08f 1/42, C08f 1/56, C08f 15/04
[58] Field of Search ........................260/94.9 D, 94.9 E, 88.2; 252/429 B, 453

[56] References Cited

UNITED STATES PATENTS

| | | | |
|---|---|---|---|
| 2,912,421 | 11/1959 | Juveland et al. | 260/94.9 D |
| 3,506,633 | 4/1970 | Matsuura et al. | 260/94.9 D |
| 3,513,150 | 5/1970 | Matsuura et al. | 260/94.9 D |

*Primary Examiner*—Joseph L. Schofer
*Assistant Examiner*—A. Holler
*Attorney*—Bierman & Bierman

[57] ABSTRACT

The catalyst used in the process of the present invention is prepared by reacting a heat-resistant metal oxide with a titanium halide to form a reaction product. The reaction product is hydrolized, dried and then reacted with an organoaluminum compound. The unreacted organoaluminum compound is then removed.

14 Claims, No Drawings

PROCESS FOR THE POLYMERIZATION OF OLEFINS

This application is a streamlined continuation of co-pending Ser. No. 824,264 filed May 13, 1969, now abandoned.

This invention relates to a process for the polymerization of olefins. More particularly, this invention relates to a process for the polymerization of olefins by using a novel catalyst.

Known heretofore as polymerization catalysts for olefins, especially for ethylene polymerization are the so-called Ziegler catalysts as well as a number of catalysts composed of compounds of the transition metals of Groups IVa – VIa of the Periodic Table and alkyl metal compounds of Groups Ia – IIIa of the Periodic Table. These catalysts are known to be effective for the polymerization of ethylene at low temperature and low pressure. Further, catalysts composed of compounds of the transition metals of Groups IVa – VIa of the Periodic Table and certain alkyl compounds of metals of Group IVb of the Periodic Table are known to be effective for the polymerization of ethylene.

The present inventors have now found that the polymerization of olefins can be carried out on a commercial scale using a catalyst other than the above known catalysts. It is therefore an object of this invention to provide an industrially suitable process for the polymerization of olefins. The process of the present invention can easily be achieved by the polymerization of olefins in the presence of a catalyst which has been obtained by reacting a heat-resistant metal oxide with a titanium halide, hydrolyzing the reaction product, contacting the dried hydrolyzate with an organoaluminum compound of the formula $AlR_nX_{3-n}$ wherein R represents a hydrocarbon group, X represents a halogen atom and $n$ is 2–3, and thereafter eliminating said organo-aluminum compound.

Alumina may be used as the heat-resistant metal oxides of the present invention. The alumina is prepared by calcinating crystalline, low-crystalline or amorphous alumina hydrate at a temperature of about 300° – 900° C. so as to effect dehydration. Silica or silica-alumina may also be used. Especially preferred is alumina prepared by subjecting a low-crystalline or amorphous alumina hydrate to heat treatment in the presence of water (this treatment will be referred to hereinafter as "hydrothermal treatment") and calcinating the product at a temPerature of about 300° – 900° C. to effect dehydration. Said hydrothermal treatment is carried out at a temperature above 100° C., preferably at a temperature above 150° C. Generally, this treatment is carried out at a temperature of 150°–350° C., with 200° – 300° C. being preferred. The time needed for the hydrothermal treatment is usually from 10 minutes to 10 hours. However, this treatment may be carried out for a longer period of time. In general, the time needed for the hydrothermal treatment will decrease as the temperature increases. Alumina hydrate subjected to the hydrothermal treatment is calcined at 300° – 900° C., preferably at 400° – 700° C. to yield dehydrated alumina. Calcination for the dehydration of alumina hydrate is best carried out over a 1 hour period.

The heat-resistant metal oxide is reacted with a titanium halide. Titanium tetrachloride is preferably used from an industrial point of view but other titanium halides such as titanium tetrabromide, titanium tetraiodide may also be used.

The reaction between alumina and titanium halide is generally carried out at a temperature ranging from 50° – 700° C. Where the reaction is carried out at a temperature in the lower end of said range, unreacted titanium halide may remain in the reaction product. Therefore, when the reaction is carried out at a temperature below 300° C. it is desirable to heat the reaction product at a temperature above 300° C. in an inert gas atmosphere in order to complete the reaction. This reaction results in a new compound having a tetravalent titanium.

The reaction between the heat-resistant metal oxide and titanium halide can be carried out by various methods. For example, when titanium tetrachloride is employed as titanium halide, it is desirable to charge the heat-resistant metal oxide into a vertically constructed reactor and to introduce a stream of inert gas carrying titanium tetrachloride from the bottom of the reactor whereby the reaction proceeds while maintaining the heat-resistant metal oxide in a fluidized state. Another reaction mode is when the heat-resistant metal oxide is immersed into liquid titanium tetrachloride and then heated.

The reaction product of the heat-resistant metal oxide with a titanium halide is hydrolyzed in an aqueous medium to yield the hydrolyzate which contains substantially no residual halogen. The hydrolyzing treatment can be carried out by any conventional method. For example, the hydrolysis can be achieved by merely boiling in water the reaction product of the heat-resistant metal oxide and the titanium halide. When ammonia water or the like is used, hydrolysis is carried out readily at ordinary temperatures.

The activity of the catalysts employed in the process of this invention is seriously affected by the residual amount of halogen in the hydrolyzate. The catalytic activity often decreases as the amount of residual halogen increases. On hydrolysis, therefore, it is desirable to prepare the hydrolyzate by eliminating halogen as much as possible. The atomic ratio of halogen to titanium in the hydrolyzate is preferably 0.1 or less. When non-volatile salts are formed by hydrolysis as by using an aqueous sodium hydroxide solution for hydrolysis treatment, it is important that the product be washed sufficiently with water.

The thus-prepared hydrolyzate, substantially free of residual halogen, is reduced by contacting same with an organoaluminum compound to form the catalyst. It is best to dry the hydrolyzate beforehand at a temperature below 1,000° C., preferably at a temperature between 300° – 700° C. If drying is not accomplished, the organoaluminum compound will be partly decomposed, thus precluding the possibility of preparing a catalyst having good activity. On the other hand, if drying is carried out at a temperature above 1,000° C., the hydrolyzate will be denatured thereby also precluding the possibility of preparing an active catalyst.

The organoaluminum compound, capable of reducing the hydrolyzate upon contact, is represented by the general formula $AlR_nX_{3-n}$ wherein R represents a hydrocarbon group, X represents a halogen atom and $n$ is 2–3. Examples of these organoaluminum compounds include, for example, trialkyl-aluminums such as trimethylaluminum, triethylaluminum, tripropylaluminum, triisobutylaluminum, tri-n-octylaluminum, etc; dialkylaluminum monohalides such as dimethylaluminum monohalide, diethylaluminum monohalide, dipropylaluminum monohalide, diisobutylaluminum monohalide, di-n-octylaluminum monohalide, ethylisobutylaluminum monohalide, etc. or a mixture of said compounds. Trialkylaluminums and dialkylaluminum monohalides containing other alkyl groups or a mixture of said compounds can be employed equally well. As the halogen, either chlorine, bromine or iodine can be effectively used.

Reduction of the hydrolyzate is carried out by using the above described organoaluminum compounds. The reduction is carried out at a temperature below 150° C., preferably at a temperature below 100° C., by contacting the hydrolyzate with the organoaluminum compound. If the reduction temperature exceeds 150° C., the desired catalytic activity will not be achieved.

The contact time varies according to the reduction temperature, the concentration of organoaluminum compound, the mode of contact, etc. but generally a contact time of from several minutes to one hour is sufficient. Contact for a long period of time, say, over one hour, is generally not necessary save for the case where reduction is carried out at a lower temperature or with a lower concentration.

In the reduction reaction, the organoaluminum compound may be used as such but an appropriate inert hydrocarbon may be used as a diluent to insure a thorough contact.

The necessary quantity of the organoaluminum compound varies according to the organoaluminum compounds used. In general, the preferred quantity is 0.03 or more, with a quantity of at least 0.1 being most preferred, in terms of the atomic ratio of Al/Ti based on Ti present in the hydrolyzate. Taking into account impurities and other factors such as in the case when a diluent is used, the organoaluminum compound is employed in an amount such that the ratio of Al/Ti is 0.1 to 1.0. When the ratio of Al/Ti is less than 0.03, it becomes impossible to obtain an active catalyst. Although no upper limit exists for the ratio, an excessively large quantity of organoaluminum compound is not desirable because no further enhancement in catalytic activity can be expected and furthermore an excess of organoaluminum compound makes its removal difficult.

After the reduction step it becomes necessary to separate the organoaluminum compound from the catalyst. Upon separation from the compound, the free organoaluminum compound must be removed substantially intact from the catalyst by means of operations such as filtration, washing, distillation, etc. When removal is not complete and the organo-aluminum compound remains in the catalyst, the catalytic activity will be lowered. Lowering of the catalytic activity will be manifested in the case of a polymerization being carried out at 100° C. or more, particularly above 150° C.

In accordance with this invention, the polymerization of olefins is carried out by using the catalyst as prepared above. Olefins which can be used for the polymerization reaction include ethylene, propylene, butene-1 and the like. It is also possible to copolymerize a mixture of said olefins.

The polymerization reaction is carried out by dispersing the catalyst into an inert solvent, adding an olefin thereto and maintaining the mixture at a given temperature and pressure.

Examples of the inert solvents include saturated hydrocarbons. N-hexane, n-heptane and cyclohexane are preferred but other solvents generally used for the polymerization of olefins may be used. The reaction is carried out at a relatively low temperature and pressure; the reaction temperature is within the range from room temperature to 300° C., preferably within the range from 50° – 250° C. The reaction pressure is within the range from 10 to 200 kg/cm³, preferably within the range from 20 to 100 kg/cm³.

When the polymerization of olefins is carried out in accordance with the process of this invention, hydrogen may be present in the reaction system to control the molecular weight of the resulting polyolefins. The amount of hydrogen present will vary according to the polymerization conditions and the desired molecular weight of polyolefin. A partial pressure of hydrogen of 0.1 – 500 percent of the partial pressure of ethylene is sufficient; 10 – 100 percent is generally preferred.

Insofar as the catalyst used in the process of the present invention is readily deactivated by moisture, oxygen, etc., the reactant materials supplied to the polymerization system such as olefin, hydrogen and solvent are preferably those which have been previously refined by dehydration and deoxygenation. During the reaction, dehydrating and deoxygenating reagents may be present so as to further refine the olefin, hydrogen and solvent. The dehydrating and deoxygenating reagents include alkali metals, alkali metal hydrides and the like.

The catalyst of the present invention has a high catalytic activity compared with the catalysts used heretofore. The resulting polymers or copolymers of olefins are linear crystalline polymers having high molecular weights and are widely used as tough, colorless shaped articles of high density.

EXAMPLE 1

130 g of commercially available alumina trihydrate prepared by Bayer process (hydrargillite) were charged into a vertically constructed glass reactor. The particle size was 30–100μ. The alumina hydrate was calcined at 500° C. in a stream of dry nitrogen. While the temperature was maintained at 375° C., a dry nitrogen gas carrying titanium tetrachloride was passed through a titanium tetrachloride saturator and then introduced into the lower end of the reactor. The reaction was carried out for 2 hours. During the reaction, the temperature of the titanium tetrachloride saturator was maintained at 63° C. and the feed rate of the nitrogen gas at the inlet was kept at 140 cm/minute (linear velocity) so as to form fluidized layers in the reactor. The quantity of titanium tetrachloride used for the reaction was 54 ml. After completion of the reaction, dry nitrogen gas was introduced for 10 minutes to expel the remaining titanium tetrachloride and then the reaction product of alumina and titanium tetrachloride was discharged from the lower end of the reactor.

50 g of this reaction product were immersed into 500 ml of 1 percent ammonia water to effect neutralization and hydrolysis. The hydrolyzate was then thoroughly washed with water to eliminate residual chlorine and then dried at 120° C. A chemical analysis of the hydrolyzate showed that it was a new compound composed of titanium, aluminum and oxygen, containing 3.24 percent by weight of titanium with no chlorine present.

2 g of the hydrolyzate were charged into a vertically constructed glass reactor and dried at 600° C. in a stream of argon. After drying, the hydrolyzate was contacted at a temperature of 30° C. with 50 ml of triethylaluminumcyclohexane solution (concentration: 27 m-mol/liter) for 10 minutes to effect reduction. Prior to the reduction reaction, the atomic ratio of Al/Ti was 1.0. After the reduction was completed, the product was washed thoroughly with cyclohexane (which had been dehydrated and deoxygenated) until triethylaluminum was no longer detected in the washing solution. After washing, the product was completely dried with dry argon gas.

The above washing and drying treatments were all carried out at 30° C.

50 mg of the catalyst prepared as described above and 50 ml of dehydrated and deoxygenated cyclohexane were introduced into a one-liter autoclave. The air in the autoclave was replaced with high purity nitrogen and the autoclave was then heated and maintained at 180° C. Gaseous ethylene containing 12 percent hydrogen was introduced into the autoclave while stirring. The polymerization was carried out for 30 minutes under a constant pressure of 40 kg/cm³ (total pressure) to obtain 35 g of polyethylene having an average molecular weight of 85,000 and a density of 0.967.

EXAMPLE 2

200 g. of commercially available low-crystalline alumina hydrate (Neobead C-MS; particle size 120 = 30μ; Mizusawa Kagaku) and 1.3 liters of water were charged into a 2-liter autoclave. The mixture was then subjected to a hydrothermal treatment at 250° C. for 2 hours to obtain about 150 g of pseudo-boehmite. 100 g of the resulting pseudo-boehmite were calcined at 400° C. The treatment was otherwise similar in every respect to the one described in Example 1. A new compound composed of titanium, aluminum and oxygen and containing 11.2 percent by weight of titanium was obtained.

From 2 g of the hydrolyzate thus obtained, the catalyst was prepared according to a process identical with that described in Example 1, using 50 ml of triethylaluminumcyclohexane solution (concentration: 93 m-mol/liter). The polymerization of ethylene was carried out under reaction conditions described in Example 1, utilizing 50 g of the prepared catalyst. 110 g of polyethylene having an average molecular weight of 95,000 and a density of 0.967 were obtained.

EXAMPLE 3

A series of catalysts were prepared as per the method of Example 1, except that the concentration of the triethylaluminum cyclohexane solution was varied as shown in Table 1. Using these catalysts, the polymerization of ethylene was carried out under reaction conditions identical to those described in Example 2. The results are shown in Table 1.

TABLE 1

| Nos. | Concentration of triethyl-aluminum solution (m-mol/liter) | Atomic ratio of Al/Ti at the time of reduction | Velocity of polymerization (g.EP/ g. Cat.hr) | Average molecular weight |
| --- | --- | --- | --- | --- |

| Nos. | | | | |
|---|---|---|---|---|
| 1 | 1 | 0.01 | 150 | 98,000 |
| 2 | 3 | 0.03 | 900 | 92,000 |
| 3 | 5 | 0.05 | 2800 | 101,000 |
| 4 | 9 | 0.1 | 4200 | 93,000 |
| 5 | 19 | 0.2 | 4300 | 99,000 |
| 6 | 93 | 1.0 | 4400 | 95,000 |
| 7 | 930 | 10.0 | 4200 | 92,000 |

From the tabulated results it is evident that when the ratio of Al/Ti is less than 0.03 it is difficult to obtain a catalyst having high activity and that an increase in the ratio of Al/Ti does not afford a proportional increase in catalyst activity.

EXAMPLE 4

The polymerization of ethylene was carried out as described in Example 2, except that the reduction temperature of the hydrolyzate was varied as shown in Table 2.

In cases where the reduction temperature exceeded 100° C., isoparaffins of high boiling points were used in place of cyclohexane.

TABLE 2

| Nos. | Reduction temperature (°C.) | Velocity of polymerization (g. EP/g. Cat.hr.) | Average molecular weight |
|---|---|---|---|
| 1 | 10 | 4300 | 96,000 |
| 2 | 30 | 4400 | 95,000 |
| 3 | 60 | 4300 | 101,000 |
| 4 | 100 | 2500 | 98,000 |
| 5 | 150 | 250 | 82,000 |
| 6 | 180 | <100 | |

From the above-tabulated results, it is evident that where the reduction temperature exceeds 150° C., satisfactory catalytic activity cannot be achieved.

EXAMPLE 5

A series of catalysts were prepared as per the method of Example 2 except that the drying temperature of the hydrozylate was varied as shown in Table 3. The polymerization of ethylene was then carried out under reaction conditions identical to those described in Example 2. The results are shown in Table 3.

TABLE 3

| Nos. | Drying temperature (°C.) | Velocity of polymerization (g. EP/g. Cat.hr.) | Average molecular weight |
|---|---|---|---|
| 1 | 120 | 1200 | 120,000 |
| 2 | 200 | 1500 | 122,000 |
| 3 | 300 | 1900 | 110,000 |
| 4 | 400 | 4400 | 95,000 |
| 5 | 500 | 4500 | 88,000 |
| 6 | 600 | 4700 | 80,000 |
| 7 | 700 | 2800 | 75,000 |
| 8 | 800 | 600 | 74,000 |
| 9 | 900 | 250 | — |

EXAMPLE 6

A series of catalysts were prepared as per the method described in Example 2 except that the organoaluminum compound was varied as shown in Table 4. The polymerization reaction was then analogously carried out as described in Example 2 and the results are shown in Table 4.

TABLE 4

| Nos. | Organoaluminum compounds | Velocity of polymerization (g.EP/g.Cat.hr.) | Average molecular weight |
|---|---|---|---|
| Ex. 2 | Al(C$_2$H$_5$)$_3$ | 4400 | 95,000 |
| 1 | Al(iso-C$_4$H$_9$)$_3$ | 5100 | 101,000 |
| 2 | Al(C$_8$H$_{17}$)$_3$ | 4900 | 98,000 |
| 3 | Al(C$_{12}$H$_{25}$)$_3$ | 4800 | 91,000 |
| 4 | Al(C$_2$H$_5$)$_2$Cl | 2500 | 99,000 |
| 5 | Al(C$_2$H$_5$)$_2$I | 2300 | 102,000 |
| 6 | AlC$_2$H$_5$(iso-C$_4$H$_9$)Cl | 2600 | 88,000 |

EXAMPLE 7

A series of catalysts were prepared as per the method of Example 3 except that triethylaluminum was replaced by diethylaluminum monochloride as shown in Table 5. The polymerization of ethylene was then carried out as described in Example 3. The results are shown in Table 5.

TABLE 5

| Nos. | Concentration of Al(C$_2$H$_5$)$_2$Cl solution (m-mol/liter) | Atomic ratio of Al/Ti | Velocity of polymerization (g.EP/g.Cat.hr.) | Average molecular weight |
|---|---|---|---|---|
| 1 | 1 | 0.01 | <100 | — |
| 2 | 3 | 0.03 | 600 | 88,000 |
| 3 | 5 | 0.05 | 1900 | 105,000 |
| 4 | 9 | 0.1 | 2400 | 92,000 |
| 5 | 19 | 0.2 | 2300 | 100,000 |
| 6 | 93 | 1.0 | 2500 | 99,000 |
| 7 | 930 | 10.0 | 2600 | 102,000 |

EXAMPLE 8

The polymerization of ethylene was carried out as described in Example 2 except that the proportion of hydrogen in the ethylene-hydrogen mixture was varied as shown in Table 6. The results are shown in Table 6.

The proportion of hydrogen in the mixture of gases is expressed in terms of a mean value of H$_2$/ethylene (mol ratio) by making analysis at the time of polymerization on the vapor phase gases in the autoclave.

TABLE 6

| Nos. | H$_2$/ethylene (mol %) | Velocity of polymerization (g. EP/g. Cat.hr.) | Average molecular weight |
|---|---|---|---|
| 1 | 0 | 7800 | 450,000 |
| 2 | 10 | 6300 | 170,000 |
| 3 | 32 | 4400 | 95,000 |
| 4 | 46 | 3800 | 83,000 |
| 5 | 79 | 2900 | 62,000 |

EXAMPLE 10

Substituting a gaseous mixture of ethylene, propylene and hydrogen instead of a gaseous mixture of ethylene and hydrogen in the procedure described in Example 2, the copolymerization of ethylene and propylene was carried out as in Example 2. A copolymer having an average molecular weight of 97,000 and a density of 0.951 was obtained. An IR-absorption spectrum analysis of the copolymer thus obtained showed that the copolymer was an ethylene-propylene copolymer having branched methyl groups of 2.8 per 1,000 carbon atoms.

In this copolymerization reaction, the result of an analysis made on the vapor phase gases in the autoclave at the time of polymerization showed the following average composition:

| | |
|---|---|
| Ethylene | 87 mol % |
| Propylene | 1 mol % |
| Hydrogen | 12 mol % |

COMPARATIVE EXAMPLE

A catalyst was prepared as per the method of Example 2 except that after the reduction, the triethylaluminum cyclohexane solution was removed only by filtration with no washing treatment. The polymerization of ethylene was carried out using this catalyst. The result is shown in Table 7 below.

TABLE 7

| Washing treatment | Velocity of Polymerization (g. EP/g. Cat. hr.) |
| --- | --- |
| No | 100 |
| Yes | 4400 (Example 2) |

The result tabulated above apparently shows that when an organoaluminum compound remains in the catalyst, satisfactory polymerization activity cannot be achieved.

It is to be understood that the term "crystalline alumina hydrate" refers to an alumina hydrate which shows a particular peak when analyzed by an X-ray diffraction apparatus; the term "amorphous alumina hydrate" as used herein for the hydrothermal treatment means an alumina hydrate which does not show any particular peak and that the term "low crystalline alumina hydrate" means an alumina hydrate which shows a definite peak but the peak width is quite broad.

What is claimed is:

1. A catalyst, for the polymerization of olefins, prepared by reacting a hydrothermally treated alumina with a titanium halide to form a reaction product, said alumina being produced by heating a low crystalline or amorphous alumina hydrate at a temperature of more than 100° C. in the presence of water and then calcining it at a temperature of about 300°–900° C. to dehydrate it; hydrolyzing the reaction product to form a hydrolysate containing substantially no residual halogen; drying said hydrolysate at a temperature below 1,000° C.; and reacting the dried hydrolysate with an organo-aluminum compound at a temperature below 150° C., the ratio of aluminum atoms in the organo-aluminum compound to titanium atoms in the hydrolysate being at least 0.03 in terms of Al/Ti.

2. The catalyst as claimed in claim 1 wherein any unreacted organo-aluminum compound is removed.

3. The catalyst as claimed in claim 1 wherein the hydrolysis of the reaction product is carried out in an aqueous medium and the titanium halide is titanium tetrahalide.

4. The catalyst according to claim 1 wherein the reaction of the dried hydrolysate with the organo-aluminum compound is carried out at a temperature of from room temperature to 100° C.

5. The catalyst according to claim 1 wherein the ratio of aluminum atoms in the organo-aluminum compound to titanium atoms in the hydrolysate is 0.1 – 1.0 in terms of Al/Ti.

6. A catalyst, for the polymerization of olefins, prepared by reacting at a temperature of 50°–700° C. a titanium tetrahalide with a hydrothermally treated alumina to form a reaction product said alumina being produced by subjecting an alumina hydrate selected from the group consisting of low-crystalline alumina hydrate and amorphous alumina hydrate to hydrothermal treatment at a temperature above 100° C. and then calcining the hydrothermally treated alumina hydrate at a temperature of 300°– 900° C. to dehydrate it; hydrolyzing the reaction product in an aqueous medium to obtain a hydrolysate; drying said hydrolysate at a temperature below 1,000° C; reacting the dried hydrolysate at a temperature below 150° C. with an organo-aluminum compound of the general formula $AlR_nX_{3-n}$ wherein R represents a hydrocarbon group, X represents a halogen atom and $n$ is 2–3, and then removing any unreacted organo-aluminum compound.

7. The catalyst according to claim 6 wherein the organo-aluminum compound is represented by the formula $AlR_nX_{3-n}$, R represents an alkyl group having one – 12 carbon atoms, X represents a halogen atom having an atomic weight greater than 35 and $n$ is 2–3.

8. The catalyst according to claim 6 wherein the organo-aluminum compound is a trialkyl aluminum.

9. The catalyst according to claim 6 wherein the organo-aluminum compound is a dialkyl aluminum mono-chloride.

10. The catalyst accordinG to claim 6 wherein said hydrothermal treatment is carried out at a temperature of from 150°–350° C; said hydrothermally treated alumina hydrate is calcined at a temperature of 400°–700° C.; said reaction product is hydrolyzed in aqueous ammonia to obtain a hydrolysate wherein the ratio of chlorine atoms to titanium atoms in said hydrolysate is less than 0.1 in terms of Cl/Ti and wherein said hydrolysate is dried at a temperature of 300°–700° C.

11. A process for the polymerization of olefins, which comprises the steps of polymerizing said olefins, in an inert hydrocarbon, at a temperature ranging from room temperature to 300° C., under a pressure of 10–200 atm, and in the presence of hydrogen, with a catalyst produced by reacting a hydrothermally treated alumina with a titanium halide to form a reaction product, said alumina being produced by heating a low crystalline or amorphous alumina hydrate at a temperature of more than 100° C., in the presence of water and then calcining it at a temperature of about 300°–900° C. to dehydrate it; hydrolyzing the reaction product to form a hydrolysate containing substantially no residual halogen; drying the hydrolysate at a temperature below 1,000° C.; reacting the dried hydrolysate with an organo-aluminum compound at a temperature below 150° C., the ratio of aluminum atoms in the organo-aluminum compound to titanium atoms in the hydrolysate being at least 0.03 in terms of Al/Ti; and then removing unreacted organo-aluminum compound.

12. The process according to claim 11 wherein the partial pressure of hydrogen is 1–500 percent of the partial pressure of said olefins.

13. The process according to claim 11 wherein the polymerization is conducted at a temperature of 50°–250° C.

14. The process according to claim 11 wherein said olefins are selected from the group consisting of ethylene and ethylene containing a small amount of propylene.

* * * * *